Feb. 8, 1944.  J. J. NEUMAN  2,341,230
CONTINUOUS CENTRIFUGAL EXTRACTOR
Filed July 23, 1940  3 Sheets-Sheet 3
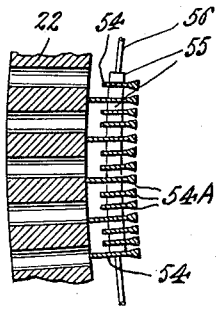
Fig. 5.
Fig. 6.
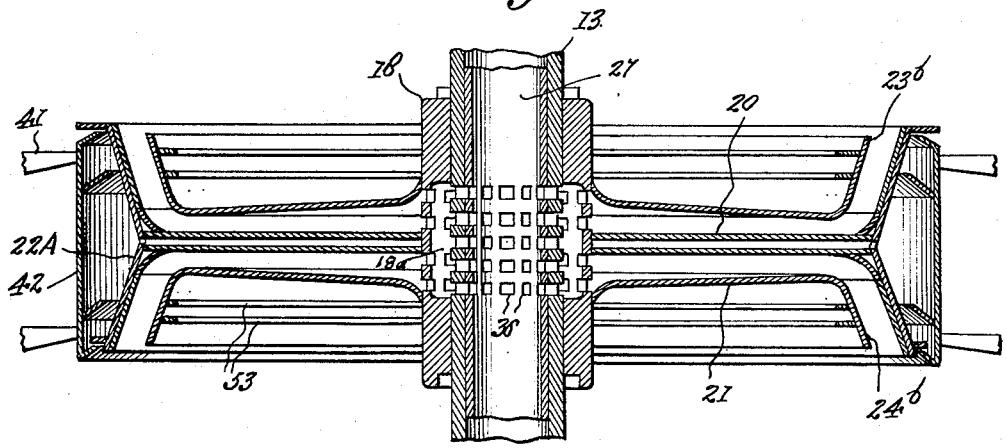
Fig. 7.
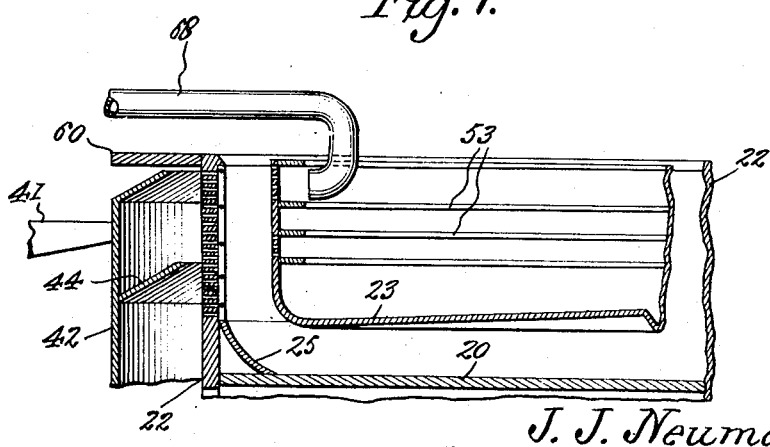
Inventor
J. J. Neuman
C. P. Goepel
By
Attorney Patented Feb. 8, 1944

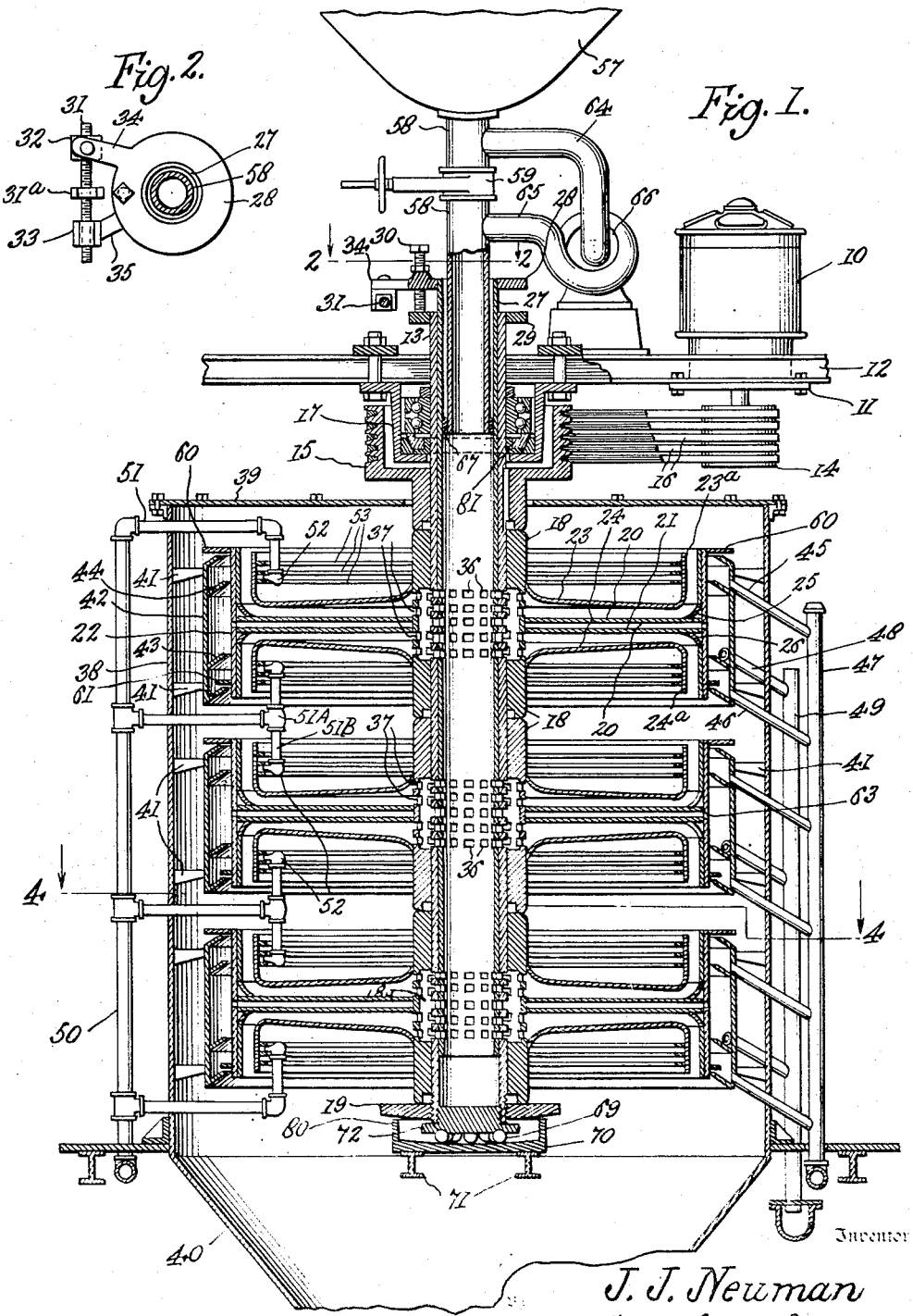

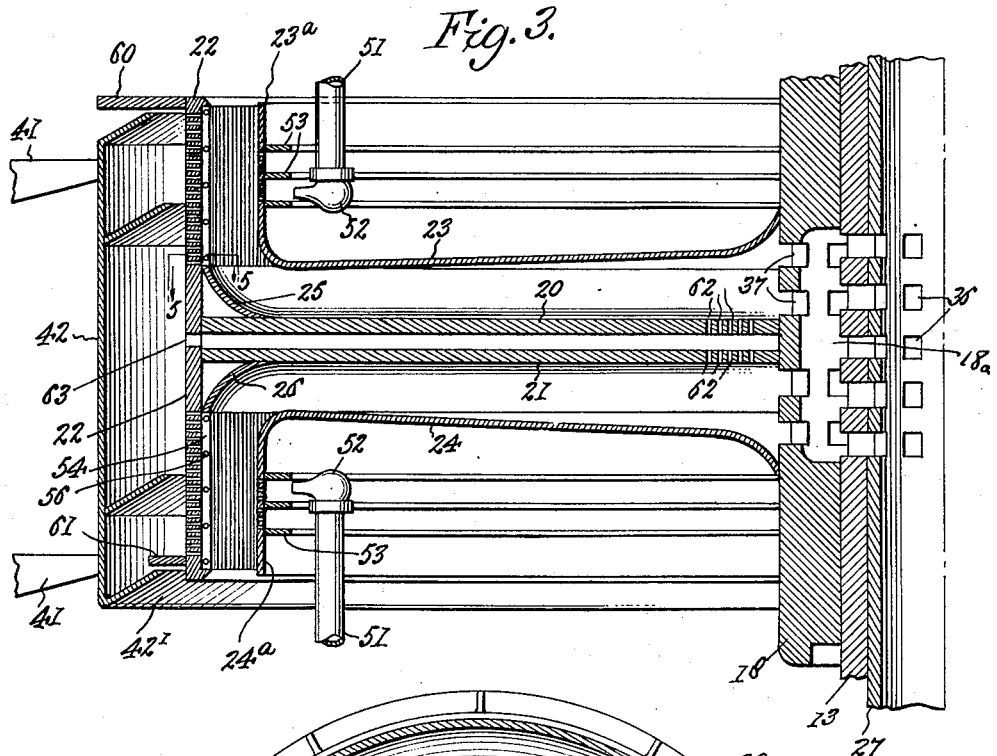
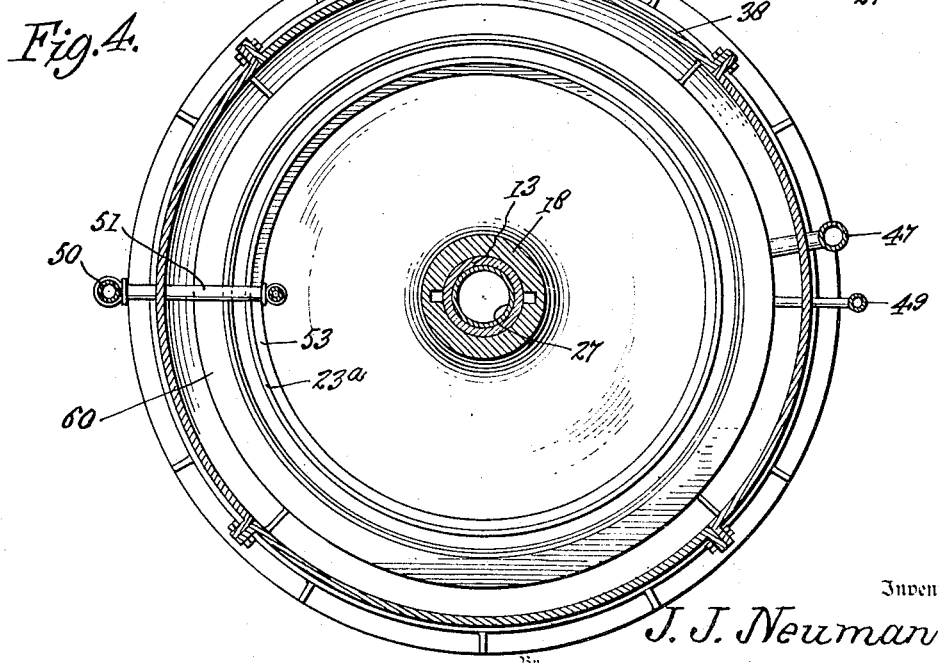

2,341,230

UNITED STATES PATENT OFFICE 2,341,230

CONTINUOUS CENTRIFUGAL EXTRACTOR

Jacob J. Neuman, South Salem, N. Y.

Application July 23, 1940, Serial No. 347,005

11 Claims. (Cl. 210—73)

This invention relates to continuous centrifugal extracting machines for separating liquids from solids and more especially to such a machine which is designed to overcome the difficulties heretofore encountered in applying the principle of a continuous centrifugal to the separation of crystalline solids such as sugars, salt and like products from their mother liquors in the refining process.

A continuous centrifugal machine is one in which the material to be separated is fed to and passes continuously over the filtering medium, which is commonly in the form of a perforated or slotted sheet and is rotated at constant speed as differentiated from the intermittent or batch type machine which is charged at slow speed then rotated to high speed and again slowed down, discharged and recharged. These batch type machines have many disadvantages since a large proportion of the total energy consumed in the operation is required for starting each time and the intermittent operation greatly limits the output per machine. These disadvantages are overcome by the continuous centrifugal.

While some types of centrifugal machines have been proposed which are designed to operate continuously, none of these have received any wide acceptance in the art. This has been due to a variety of factors such as complicated design, high cost, operating difficulties and inefficient separation of solids and liquids. This inefficient separation is due to the fact that while the mixture of liquid and crystals is passing over the filtering medium, under the pressure of centrifugal force, the filtering medium acts as an abrasive and many of the crystals whch are at first too large to pass through are ground down and pass through with the liquor. The percentage of solids thus remaining in the liquids is so high that all the economies of operation are outweighed by the cost of reprocessing the liquids to regain them.

Upon analyzing the basic causes of this grinding down of the crystals it is seen that it is mainly proportional to three factors, as follows:

1. The centrifugal force or pressure with which the material is pressed against the filtering medium over which the material is moved.

2. The coefficient of friction between the material and the filtering medium.

3. The distance or length of filtering medium over which the material is moved.

Assuming a fixed speed of rotation and basket diameter then the centrifugal force or pressure of the material on the filtering medium is dependent on the weight of the material which is, in turn, dependent on the thickness thereof. It is thus seen that the abrasion may be reduced by limiting the thickness of the wall of material. In regard to the second factor, the coefficient of friction can be reduced by improving the design of the filtering medium. However, the most important factor is the distance over which the material is moved. In all the continuous centrifugals so far proposed the material has had to pass over a considerable length of filtering medium. However, this is not necessary since by moving the material more slowly it will be subjected to the centrifugal force for the same length of time in moving over a short length of filtering medium. It is easily seen that by reducing the thickness of the wall of material and the length of screen that the production will be reduced if this is not compensated for. In the present invention this difficulty is overcome by separating the basket and filtering medium into many short zones each with its own feeding means and by performing part of the separation by means of the principle of the centrifuge or non-filtering centrifugal as will be more fully explained hereinafter.

It is, therefore, the principal object of this invention to provide a continuous centrifugal machine in which the passage of solids through the filtering medium is reduced to a minimum.

Another object is to provide an improved filtering medium which offers a minimum resistance to passage of material being filtered.

Another object and one which is closely allied with the first two is to provide a centrifugal of this type in which the separation is performed in part on the principle of the non-filtering centrifugal.

A further object is to provide means for easily and accurately separating the various grades of liquor purged out during the centrifuging.

Another object is to minimize dissolving of the crystals by action of the wash water.

A further purpose is the prevention of too rapid drying out of the material by providing means for totally enclosing it while being centrifuged.

A still further object is to provide means for complete drying of the product before discharge from the machine thus giving, as in the case of refined sugar, a finished product without necessity for further drying in so-called granulators.

In the drawings wherein like characters of reference refer to the same parts throughout the several views:

Figure 1 is an elevation partly in section serving to illustrate one embodiment of the present invention.

Figure 2 is a horizontal section on the line 2—2 of Figure 1.

Figure 3 is an enlarged fragment of Figure 1.

Figure 4 is a horizontal section on the line 4—4 of Figure 1.

Figure 5 is an enlarged fragmentary section on the line 5—5 of Figure 3.

Figure 6 is a fragmentary vertical section showing a variation in the construction.

Figure 7 is a sectional view showing a means for drying the material prior to discharge.

Referring to the drawings, the driving motor 10 is mounted on platform 11 supported by the beams 12 and drives the hollow shaft 13 through a belt and pulley arrangement including sheave 14 on the motor shaft, sheave 15 keyed to or otherwise suitably secured to the shaft 13 and V rope belts 16. The hollow shaft 13 is supported from the beams 12 by the bearing assembly 17 which is preferably of the gyratory type that compensates for irregularities in loading by allowing the centrifugal to find its own center of gravity. Secured to the hollow shaft 13 by a welding or any other suitable means are the hub members 18 which are dovetailed one to the other and to the sheave 15 and are supported by the nut 19. Welded or otherwise attached to each of the hub members 18 are two spaced apart discs 20 and 21. Welded or otherwise attached to the periphery thereof and supported thereby is the cylindrical member 22 which forms the wall of the basket. Also welded or otherwise attached to each of the hub members 18 are two dished discs 23 and 24, the disc 23 having its periphery upturned as at 23ᵃ and the disc 24 having its periphery downturned as at 24ᵃ to form substantially vertical flanges in concentric relation to the basket walls 22. Welded to the basket wall 22 and each of the discs 20 and 21 are the curved ring shaped members 25 and 26.

Fitted inside the hollow shaft 13 is the sleeve 27 having the flange 28 secured at the upper end thereof. Threaded through the flange 28 and bearing against the flange 29 of the hollow shaft 13 is the adjusting screw 30 which is adapted to raise or lower the sleeve 27 in relation to the shaft 13. The adjustment of the angular relation between the sleeve 27 and the shaft 13 is effected by means of the screw 31 which has its oppositely threaded ends screwed into the universal joints 32 and 33, which are journalled in the arms 34 and 35 of the flanges 28 and 29 respectively. The screw 31 has the nut 31ᵃ secured at the center thereof to permit the screw to be turned. Each of the hub members 18 has a centrally disposed recessed portion forming an annular chamber 18a about the periphery of the shaft 13 and, in radial alignment with said chamber, both the sleeve 27 and the shaft 13 have a series of normally matching openings 36 which communicate therewith. The periphery of the hubs 18 are also provided with a series of openings 37 which establish communication between the annular chambers 18a and the space between the discs 20 and 23 and the space between the discs 21 and 24. It is thus seen that by means of the adjustments provided by the screws 30 and 31 that the effective size of the openings 36 between the hollow shaft 13 and annular chamber 18a may be varied.

The rotating shaft 13 and baskets are encased in a cylindrical housing 38 which may be sectionalized, as shown in Figure 4, in order to facilitate inspection and repairs. It is also provided with a removable cover 39 at the top and a frusto-conical discharge portion 40 at the bottom. Around each basket wall 22 and concentric therewith is a liquor trough 42 which is supported by brackets 41 from the casing 38 at several points. The liquor trough 42 is provided with baffles 43 and 44 to separate the low grade syrup from the wash liquor as will be more fully described hereinafter. Each of the compartments formed by the baffles 43 and 44 and the top and bottom of the trough 42 have separate pipes to drain off the accumulated liquors. The pipes 45 and 46 communicate with the pipe 47 and the pipes 48 with the pipe 49.

Wash water is supplied from the main water supply pipe 50 to the top and bottom section of each basket through feeder pipes 51. The extremities of the pipes 51 are provided with nozzles 52, which direct water into the troughs formed by the baffles 53 welded to the inner side of the vertical walls 23ᵃ and 24ᵃ of the members 23 and 24. Three baffles 53 are shown forming two troughs so that the point at which the wash water is introduced can be varied. The proper point for introducing the wash water or other liquids introduced through the nozzles 52 will vary with different products and the position of the baffles 53 is determined by the product for which the extractor is being constructed. However, with some products, such as, for instance, sugar, the characteristics of the raw product, which is to be centrifuged, also varies widely depending on the locality where the cane was grown and the methods used in that particular locality in processing the cane to obtain the raw sugar. The amount of molasses in the raw sugar and the grain size of the sugar crystals are two of the factors which vary. Raws with finer grain crystals and those containing more molasses must be centrifuged longer to remove the molasses. In order to produce the best results the wash water should be introduced immediately after the bulk of the molasses and other syrups have been purged out. If the wash water is applied too soon it merely passes through with the molasses and unless large quantities are introduced the crystals are not properly washed. If the water is applied too late the remaining film of molasses on each crystal will have hardened and is not thoroughly removed by the water. In the case of sugar several baffles 53 are therefore provided with means for shifting the nozzles 52 from one trough to the other. In the present embodiment shown this may be accomplished by rotating the T connection 51A about the pipe 51 or rotating the pipe 51 itself to foreshorten the nozzle mounting pipes 51B, as viewed in Figure 1, and thus shift the nozzles from one trough to another. This results in the wash water being applied to the sugar later. As many troughs are provided as are necessary to accomplish the variation desired for the particular product to be processed. The baffles 53 also serve the purpose of strengthening and stiffening the members 23 and 24 and their vertical walls 23ᵃ and 24ᵃ. The vertical walls 23ᵃ and 24ᵃ of the members 23 and 24 are perforated in the areas opposite these troughs and around this entire circumference.

While any type of filtering medium commonly used in centrifugals may be employed, depending on the material to be processed, in order to minimize abrasion of the sugar crystals I prefer the type which I have shown in Figure 5. It is formed of a plurality of spaced apart bars 54 each having an enlarged portion 54A at the inner edge thereof and which are held in predetermined spaced apart alignment by tubular spacers 55 and are held together by circular rods 56 threaded through both the spacers 55 and the bars 54. Some of the bars 54 extend further outwardly and bear against the face of the basket wall 22, which is perforated in the region covered by the filtering medium. This feature eliminates the necessity for the spacer which is used with conventional centrifugal filtering mediums to facilitate quick draining. Referring to Figure 3, one end of each of the bars 54 are in abutment with the curved members 25 or 26 and have their inner edges in line with the inner surface thereof. The other ends of the bars 54 are held by the inturned upper and lower edges of the basket walls 22.

Positioned over the hollow shaft 13 is the reservoir 57 from which the pipe 58, provided with the valve 59, extends vertically downward into the hollow shaft 13 for feeding material thereto.

In the bypass around the valve 59 formed by the pipes 64 and 65 there is provided a pump 66 which, when the valve 59 is closed, may be operated to feed material into the machine under pressure in excess of the pressure obtained by gravity head alone. This is necessary with some materials of a heavy or dense consistency.

Even in the case when the gravity head is sufficient, it is desirable to have the pump 66 for cleaning purposes. When the machine is to be shut down and the material is all emptied from tank 57 this tank is filled with water and the valve 59 closed. The pump 66 then forces water in large volume and at high velocity through the machine cleaning out any remaining material from all the passages, valve holes 36 and 37 and off of and from between the filtering medium bars 54.

The end of the pipe 58 is terminated inside the shaft 13 at the center of gyration of the bearing assembly 17 and is provided with a suitable packing, indicated at 67, to permit pressure feeding of material to the machine. Sufficient clearance is provided between pipe 58 and sleeve 27 to permit proper gyration of the machine in accordance with the design.

In order to prevent possible entrance of discharged material from the basket section above into any of the lower liquor troughs 42, each basket wall 22 is provided at the upper edge thereof with a slinger ring 60. Each basket wall 22 is also provided with another slinger ring 61 near the bottom edge thereof and extending inside of the liquor trough 42 to prevent any liquor from splashing out.

In operation the hollow shaft 13 and the members supported thereby are rotated at the proper speed by the motor 10 and material is fed in by gravity from the reservoir 57. The material thus fed into the hollow shaft 13 flows out through the openings 36 and 37 into the passageways formed between the plates 20 and 23 and also 21 and 24. Centrifugal force then acts to force it over the filtering means. The material in these vertical sections completely fills the space between the filtering medium and the vertical sections 23ᵃ and 24ᵃ of the members 23 and 24. It is seen that the walls 23ᵃ and 24ᵃ thus determine and confine the material to a definite wall thickness. In previously proposed continuous centrifugals it has been necessary to forego drying of the product beyond a certain point and to discharge it in a much wetter condition than in the batch type machines using mechanical discharges. This is another reason for failure of such continuous centrifugals to successfully compete with batch type machines. The trouble experienced is due to the fact that the drier material nearest the discharge point adheres to the filtering medium in a greater degree than the more fluid material nearer the point of entrance. When thorough drying is attempted this causes the more fluid material to merely pass over the dry adhering material near the discharge point of the filter medium and this section of the filtering medium performs no extracting function and the dryer material is not discharged.

In the present invention, this is wholly prevented due to the confinement produced by the walls 23ᵃ and 24ᵃ and much more thorough drying is made possible.

These walls 23ᵃ and 24ᵃ also serve to overcome another difficulty experienced in both batch type and previously proposed continuous centrifugals. This is due to the fact that in such machines the sugar is exposed to air which passes through the sugar at the same time that the heavy molasses is being purged out thus drying a portion of it on the surface of the crystals. Additional wash water must then be used to remove it resulting in considerable dissolving of the crystals themselves and a consequent reduced yield of solids from the machine. Due to the total enclosure of the material by the members 23 and 24 and their peripheral walls 23ᵃ and 24ᵃ it is not exposed to air while being purged and this difficulty is entirely eliminated.

Between the plates 20 and 23 the solid matter being heavier than the liquids is partially separated therefrom, the portion of this passage nearest the hub 18 being filled with liquids. The portions of the plates 20 and 21 nearest the hubs 18 are perforated with the holes 62 (best seen in Figure 3) and the accumulated liquid passes through these holes 62 into the space between the plates 20 and 21 and is moved outwardly by centrifugal force. The basket wall 22 is provided with several holes 63 which permit these liquids to escape into the central section of the liquor trough 42. In the case of sugar, solid material does not pass into the space between the plates 20 and 21 because being heavier than the liquids it is immediately thrown outward upon passing through the holes 37. However, with some materials it is necessary to provide a filtering medium over the holes 62 to prevent the passage of solids.

While the liquids thus separated by centrifuging action are shown collected in the liquor trough 42 along with the liquor separated by filtering action prior to washing, if so desired other baffles similar to the baffles 43 and 44 may be provided and these liquids piped off separately. By providing additional baffles as many separations of syrups and washings as is desired may be effected.

The action of centrifugal force on the material in the area between the plates 20 and 23 constantly forces this material outwardly and over the filtering medium formed by the bars 54 and it is eventually discharged over the top of the basket wall 22 and falls by gravity to the bottom of the casing 38 and is guided onto a suitable conveying means by the conical portion 40.

The material in contact with the filtering medium formed by the bars 54 is acted upon by centrifugal force producing a radial force or pressure on the said filtering medium 54. The magnitude of this pressure depends on the thickness of the wall of material as determined by the member 23ª, the radius of the machine, the speed of rotation and the specific gravity of the material. It is thus seen that for a machine of given dimensions rotated at a given speed with a given material that this radial pressure is a fixed value. The transverse pressure required to move the material over the filtering medium is thus also a fixed value since the force of friction equals the radial pressure times the coefficient of friction which while it varies in accordance with the increased dryness of the material as it nears the discharge point has an average value over the length of the screen which is substantially constant.

It will thus be seen that for a basket of given design and proportions, rotated at a given speed, with a material of given consistency, weight and character, that material will continue to pass over the screen just so long as the amount of material between the members 20 and 23 is sufficient to produce a pressure due to centrifugal force which equals or exceeds the opposing force of friction between the material and the filter medium 54. If the supply of material through the shaft 13 were to be cut off the material would continue to move more and more slowly until the two forces were equal and then stop. Under these conditions the volume of material between the members 20 and 23 would have an inner radius making its weight just insufficient to produce the pressure at the periphery of the basket necessary to overcome the opposing force of friction between the material and the filtering medium 54. As soon as more material is fed in through the openings 36 and 37 the pressure would exceed the force of friction and the material would again be set in motion. In operation a sufficient excess is maintained to produce the desired rate of feed over the filtering medium the greater the excess the greater the rate.

The rate of feed thus depends on the proportions of the machine which is constructed in accordance with the kind of material to be processed and is further variable depending on the manner of operation and the setting of the various adjustments.

Water fed in through the nozzles 52 is held between the baffles 53 by centrifugal force and is forced out through the holes in the members 23ª and 24ª and thence through the wall of material. It will be seen that the water is speeded up in the trough and when passing through the holes is travelling at the same speed, in a rotational sense, as the material. In conventional centrifugals the water has a rotational velocity of practically zero when it first strikes the rapidly moving material in the basket and is then accelerated by the material. This action causes considerable dissolving of sugar which is prevented in the present invention. This may be demonstrated by the analogy of putting a cube of sugar in a cup of coffee. If the coffee is not stirred the sugar takes a long time to dissolve but rapidly dissolves when stirred. This is exactly what happens when the water strikes the rapidly moving wall of sugar in the conventional machine.

In a similar manner that division of the basket wall 22 which circumscribes the peripheral wall 24ª simultaneously receives material from the source by means of the passageway between the discs or plates 21 and 24. This material is thrown out by centrifugal force, being deflected by the curved elbow 26 into the annular filtering passages between the basket wall 22 and the peripheral wall 24ª, which latter is the limiting or restricting wall, determining by its distance from the concentric wall of the basket and filtering medium the thickness of wall of the material at any time undergoing separation by its progress over that section of the filtering medium lying outwardly of limiting wall 24ª.

In this instance the centrifugal force crowding the material around the bend 26 forces it to traverse the space outside the wall 24ª and over the filtering medium, after which the rejected material is discharged downwardly, being baffled by the wall 42' at the lower end of the liquor trough 42, thus causing such rejected material to be discharged into the casing 38 and thence to the hopper bottom 40. Therefore the invention contemplates in one aspect the division of the overall surface of the filtering medium of a continuous extractor over which ordinarily the entire material processed would be required to pass in a long path into a number of comparatively short sections into which simultaneously and separately divided groups of the material are individually received and processed thus causing the crystals to move over short lengths of filtering media with only narrow thickness of wall of the material. Adjoining sections of the filtering medium may or may not receive the material to be processed at adjoining ends thereof. The arrangement shown in Figure 3 is for convenience in that a single passage between adjoining plates 20 and 21 will serve the two passageways between plates 20 and 23 and 21 and 24.

With some types of materials in order to insure proper feeding it is necessary to construct the machine with the basket wall disposed at an angle to the axis of rotation of the machine instead of parallel to it, as shown in the embodiment of Figure 1. The basket wall thus may flare outwardly and away from the axis of the machine or even inwardly toward the axis of the machine forming an obtuse or acute angle with the plates 20 and 21 as the case may be and of the proper degree best suited for the conditions to be encountered. In Figure 6 I have shown one such variation where the basket walls 22A flare outwardly. The members 23ᵇ and 24ᵇ are also flared outwardly at substantially the same angle.

In Figure 7, which is a fragmentary sectional view taken at a different point on the periphery than Figure 1, I have shown a pipe 68 which is provided in connection with each basket section in a similar manner to the water pipes 51 for passing hot air or other suitable aeroform fluid through the material for drying purposes just previous to discharge. By means of this feature used in conjunction with a product like refined sugar the material is thus discharged in final form ready for grading and packaging thus eliminating the granulators commonly employed for final drying.

While three basket sections are shown mounted on the shaft 13 it is to be understood that this shaft may be much longer and several more sections added if desired.

In the case where very many basket sections are employed, I have designed a novel step bearing which is located at the bottom of the shaft 13 and supports the weight of the basket assembly while at the same time permitting gyratory alignment about the center of the bearing 17. Ball bearings 69 are carried in a raceway provided in the member 72 and rest on the plate 70. The upper surface of the plate 70 is a segment of a sphere which has its center coinciding with the center of gyration of the bearing 17. The step bearing is supported on a suitable beam structure indicated at 71.

The plate 70 may be provided with a flange 80 to retain lubricant, the nut 19 projecting beyond the flange for accessibility in rotation and to provide an overhang tending to confine the lubricant. A grease seal is afforded by packing 81 within the bearing assembly.

It will be appreciated that the filtering medium is divided into a plurality of short sections to provide short paths over the filtering medium for the crystalline material being processed in order to minimize abrasion of said crystalline material which would cause it to pass through the filtering medium along with liquids being extracted.

Also the purpose of limiting the wall thickness is to minimize frictional abrasion between the material and the filtering medium by maintaining low centrifugal bearing pressure of the material against said filtering medium.

It is also pointed out that part of the separation is performed before the material passes over the filtering medium 54 due to the difference in specific gravity of the solids and liquids, the liquids remaining nearer the axis of the machine and being discharged through the openings 62. This is important since, if the liquids are partially removed prior to passing over the filtering medium less time is consumed in completing the separation at the filtering medium, thus permitting higher rates of feed and increased capacity of the machine. Generically this is the first centrifugal design which operates on both the principle of the filtering and non-filtering types of machines.

With regard to Figure 5, it will be noted that the space bars 54 of the filtering medium are disposed parallel to the direction of movement of the material thereover in order to offer minimum resistance to and abrasion of the material during its passage.

What is claimed is:

1. A continuous centrifugal extractor comprising a hollow perforated shaft, a centrifugal basket affixed to said shaft, a hollow perforated sleeve rotatable and axially slidable within said shaft and in communication internally with a source of material supply, means for causing said sleeve and shaft to relatively move axially, and other means to cause said sleeve and shaft to relatively move angularly to adjust the port areas of said openings to regulate the feed of material to said centrifugal.

2. In a continuous centrifugal extractor for separating liquids from crystalline solids, in combination, a hollow perforated rotatable vertical shaft in communication with a source of material to be processed, a plurality of axially spaced baskets mounted on said shaft and rotatable therewith, said baskets being arranged in pairs, the baskets of each pair being oppositely disposed with respect to one another and comprising two axially spaced substantially horizontal discs extending radially outwardly from said shaft, and terminating in relatively short cylindrical perforated filtering sections projecting upwardly from one of said discs and downwardly from the other of said discs, a pair of axially spaced dished plate members mounted on said shaft in spaced relation to said discs and sections and oppositely disposed with respect to one another, said plate members cooperating with said discs and sections to form separate channels in communication with said hollow shaft to separately feed material to said filtering sections and limit the wall thickness of the material being processed over said sections, a radial passageway formed between the spaced discs of each pair of baskets, and transverse ports in said spaced discs adjacent said shaft in open communication with said passageway.

3. A continuous centrifugal extractor comprising a hollow rotatable perforated shaft in communication with a source of material to be processed, a plurality of axially spaced radial disc members mounted on said shaft and rotatable therewith, a separate relatively short cylindrical basket section on the outer end of each disc member, a plurality of axially spaced radially extending plate members mounted on said shaft, each disposed between adjacent disc members and in spaced relation thereto, said plate members cooperating with said disc members to form a plurality of radial passageways in communication with said hollow shaft for separately feeding material to said basket sections, axially projecting walls on the outer ends of said plate members spaced radially inwardly from adjacent cylindrical basket sections for limiting the wall thickness of material passing over said basket sections, means for supplying fluid to said basket sections, and a housing totally enclosing said basket sections.

4. In a continuous centrifugal extractor, in combination, a hollow rotatable perforated vertical shaft in communication with a source of material to be processed, a plurality of axially spaced radial disc members mounted on said shaft and rotatable therewith, a separate relatively short cylindrical basket section on the periphery of each disc member, a plurality of axially spaced radially extending plate members mounted on said shaft and rotatable therewith in spaced relation to said disc members to form with the latter a plurality of channels for separately feeding material to said basket sections, a cylindrical wall on the outer end of each plate member spaced radially inwardly from the adjacent basket section for limiting the wall thickness of material passing over the latter and forming a centrifuging chamber, each of said cylindrical walls having a perforated portion, spaced baffles extending inwardly from said cylindrical walls towards said shaft and forming annular troughs in radial alignment with said perforated portions, and means for supplying fluid to said troughs for passage into said centrifuging chambers through said perforated portions.

5. In a continuous cylindrical extractor for separating liquids from crystalline solids, in combination, a hollow rotatable perforated vertical shaft in communication with a source of material to be processed, a plurality of axially spaced radial disc members mounted on said shaft and rotatable therewith, a separate relatively short cylindrical basket section on the periphery of each disc member, a plurality of axially spaced radially extending plate members mounted on said shaft and rotatable therewith in spaced relation to said disc members to form with the latter a plurality of channels for separately feeding material to said basket sections, a cylindrical wall on the outer end of each plate member spaced radially inwardly from the adjacent basket section for limiting the wall thickness of material passing over the latter and forming a centrifuging chamber, each of said cylindrical walls having a perforated portion, spaced baffles extending inwardly from said cylindrical walls towards said shaft and forming annular troughs in radial alignment with said perforated portions, and means for supplying wash water to said troughs for passage into said chambers to wash the purged crystalline solids prior to their discharge from said chambers.

6. In a continuous centrifugal extractor for separating liquids from crystalline solids, in combination, a hollow rotatable perforated vertical shaft in communication with a source of material to be processed, a plurality of axially spaced radial disc members mounted on said shaft and rotatable therewith, a separate relatively short cylindrical basket section carried on the periphery of each disc member, a plurality of axially spaced radially extending plate members rotatable with said shaft in spaced relation to said disc members to form with the latter a plurality of channels in communication with said shaft for separately feeding material to said basket sections, a cylindrical wall formed on the outer end of each plate member spaced radially inwardly from the adjacent wall of the basket sections to form a short annular centrifuging chamber, each chamber opening in communication with a separate material feeding channel at one end and being open at its opposite end for the discharge of centrifuged crystalline solids, filtering medium on the outer circumference of each centrifuging chamber, each of said inwardly spaced cylindrical walls having perforated portions, means for supplying water through said perforated portions into said chambers to wash the crystalline solids therein prior to discharge therefrom, means for supplying warm air to the crystalline solids in said chambers spaced axially from said water supplying means adjacent the discharge end of the latter, and a casing totally enclosing said plurality of basket sections.

7. A continuous centrifugal extractor for the separation of liquids from crystalline solids comprising in combination, a casing, a plurality of axially spaced rotatable baskets dividing the interior of said casing into a plurality of relatively short centrifuging paths to minimize grinding up of crystalline solids, each basket including a radially extending feed channel and a relatively short axially extending separating chamber having a perforated outer wall for the discharge of liquids and being in open communication at one end with the outer end of the feed channel and open at its other end for the discharge of purged crystalline solids, means for separately feeding material to be processed to each of said feeding channels for passage of the material axially along the respective separating chamber, and means for rotating said plurality of baskets.

8. A continuous centrifugal extractor for the separation of liquids from crystalline solids comprising, in combination, a casing, a plurality of axially spaced rotatable baskets dividing the interior of said casing into a plurality of relatively short centrifuging paths to minimize grinding up of crystalline solids, each basket including a radially extending feed channel and a relatively short axially extending separating chamber having a perforated outer wall for the discharge of liquids and being in open communication at one end with the outer end of the feed channel and open at its other end for the discharge of purged crystalline solids, means for separately feeding material to be processed to each of said feeding channels for passage of the material axially along the respective separating chamber, means for regulating the supply of material to each feed channel, and means for rotating said plurality of baskets.

9. A continuous centrifugal extractor for the separation of liquids from crystalline solids comprising, in combination, a casing, a plurality of axially spaced rotatable baskets dividing the interior of said casing into a plurality of relatively short centrifuging paths to minimize grinding up of crystalline solids, each basket including a radially extending feed channel and a relatively short axially extending separating chamber having a perforated outer wall for the discharge of liquids and being in open communication at one end with the outer end of the feed channel and open at its other end for the discharge of purged crystalline solids, means for separately feeding material to be processed to each of said feeding channels for passage of the material axially along the respective separating chambers, means for supplying wash water to each chamber adjacent the open end of the latter for washing separated crystalline solids prior to their discharge from the chamber, and means for rotating said plurality of baskets.

10. A continuous centrifugal extractor for the separation of liquids from crystalline solids comprising, in combination, a casing, a plurality of axially spaced rotatable baskets dividing the interior of said casing into a plurality of relatively short centrifuging paths to minimize grinding up of crystalline solids, each basket including a radially extending feed channel and a relatively short axially extending separating chamber having a perforated outer wall for the discharge of liquids and being in open communication at one end with the outer end of the feed channel and open at its other end for the discharge of purged crystalline solids, means for separately feeding material to be processed to each of said feeding channels for passage of the material axially along the respective separating chambers, means for limiting the wall thickness of material in each separating chamber whereby to maintain a relatively low centrifugal bearing pressure against the perforated outer wall of the chamber, and means for rotating said plurality of baskets.

11. A continuous centrifugal extractor as claimed in claim 7 wherein said plurality of baskets are arranged in pairs with the baskets of each pair oppositely disposed with respect to one another whereby one basket of each pair provides a centrifuging path extending axially in one direction and the other basket of each pair provides a centrifuging path extending axially in the other direction.

JACOB J. NEUMAN.